United States Patent

Hoegger

[15] 3,674,146
[45] July 4, 1972

[54] METHOD OF REGENERATING FILTER AIDS

[72] Inventor: Anton Hoegger, Rapperswil/St. Gallen, Switzerland

[73] Assignee: Hans Muller, Maennedorf/Zurich, Switzerland

[22] Filed: July 2, 1970

[21] Appl. No.: 51,769

[30] Foreign Application Priority Data

July 9, 1969 Switzerland ..........................10591/69

[52] U.S. Cl. ....................................210/73, 210/75, 210/84, 210/193, 210/195
[51] Int. Cl. ........................................................B01d 37/02
[58] Field of Search ................210/75, 83, 84, 190, 191, 193, 210/195, 73; 209/158, 162, 211, 458–460

[56] References Cited

UNITED STATES PATENTS

| | | | |
|---|---|---|---|
| 3,362,533 | 1/1968 | Muller | 210/75 |
| 3,051,310 | 8/1962 | Gwrnne | 209/211 X |
| 3,551,330 | 12/1970 | Jernqvist et al. | 210/83 X |
| R26,720 | 11/1969 | Visman | 209/211 |
| 934,441 | 9/1909 | Hitchcock | 29/158 |
| 3,482,693 | 12/1969 | Muller | 210/75 |

*Primary Examiner*—John Adee
*Attorney*—Michael S. Striker

[57] ABSTRACT

Spent particular alluvial filter aid is separated from entrapped impurities by wet classification, and subsequently gravitational segregation of the separated particles of filter aid is effected in a streaming liquid into two fractions one of which contains finer particles and the other of which contains coarser particles.

8 Claims, 2 Drawing Figures

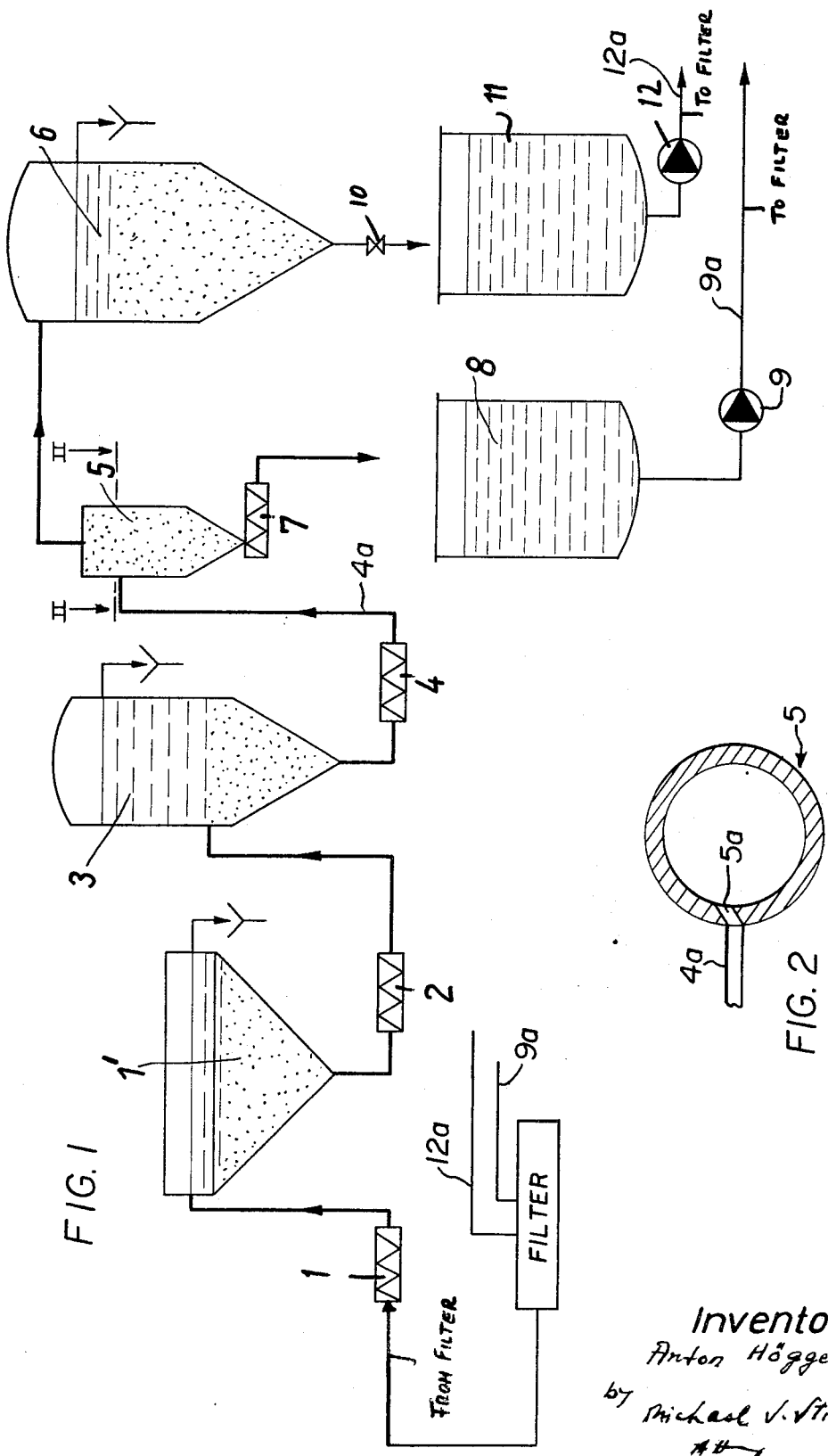

3,674,146

METHOD OF REGENERATING FILTER AIDS

BACKGROUND OF THE INVENTION

The present invention concerns the regeneration of filter aids, and more particularly the regeneration of filter aids used in the filtration of viscous solutions.

In prior U.S. Pat. No. 3,362,533 there is disclosed a process for the filtration of artificial silk and synthetic foil spinning materials by means of filter surfaces to which an alluvial medium is applied. The there-disclosed process utilizes a regenerable alluvial medium which is resistant to the viscous solution to be filtered and which, at the end of each filtration process, is suspended in a liquid wherein it is freed from adhering impurities such as swelling substances which are the impurities mainly to be removed from the viscous solution by filtration, fibers and dirt particles. Thereupon, the alluvial medium is returned to the following filtering process. The utilization of the alluvial filter aid involves the deposition of a relatively thick layer of the granular alluvial material on the horizontal elements of a filter structure. In the case of substances which are difficult to filter a certain quantity of the filter aid may also be added to the unfiltered solution in addition to the alluvium which forms the actual filtering layer, the purpose being to keep the filtering layer porous as long as possible. The same granulates may be used in both instances, although frequently the granulates for the alluvial layer and those to be added to the unfiltered solution may have different gain or particle sizes.

According to the aforementioned U.S. patent the spent filter aid—that is the filter aid constituting the alluvial layer and—where this applies—the filter aid which has been added to the unfiltered solution and which has of course been retained by the alluvial layer, must be regenerated which is accomplished by subjecting it to wet classification. In so doing the spent filter aid becomes separated from the entrapped impurities, such as swelling substances and cellulose fibers. The separated impurities are removed and the separated filter aid can now be used for filtration.

I have found it particularly advantageous to use a synthetic plastic powder or granulate, preferably but not exclusively polyvinyl chloride, as an emulsion and suspension polymerizate at particle sizes of 15–200 microns. I have also found, however, that optimum in clarification and filtration capability (i.e. duration for which the alluvial layer is capable of supporting filtration) is achievable when the granulate is composed of a mixture of particles of different sizes which are of course present in random distribution. The precise composition of the mixture, that is the relationship of particles of a coarser size range to the relationship of particles of a finer or smaller size range, depends upon various factors, including the quality of the viscose in the solution to be filtered, and the types of impurities which are to be removed. By varying the aforementioned relationship it is possible to adapt the composition of the alluvial layer—and thereby the filtration capability thereof—to provide optimum results with respect to prevailing requirements in any given instance.

SUMMARY OF THE INVENTION

It is, accordingly, an object of the present invention to provide this just-described desirable feature.

More particularly it is an object of the present invention to provide an improved method of regenerating filter aids of the type here under discussion.

Still more specifically it is an object of the invention to provide such an improved method of regenerating filter aids in such a manner that it is possible to select in the regenerated filter aid a desired particle-size combination in accordance with prevailing requirements.

In pursuance of the above objects, and others which will become apparent hereafter, one feature of the invention resides, briefly stated, in a method of regenerating filter aids used in the filtration of viscous solutions and consisting of granulates having randomly distributed particle sizes. This method comprises the steps of subjecting the spent filter aid to wet classification for thereby separating it from entrapped impurities and subsequently effecting gravitational segregation of the thus-separated particles in a streaming liquid into two fractions one of which contains finer particles and the other of which contains coarser particles.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a simplified flow diagram illustrating the steps involved in carrying out the novel method; and FIG. 2 is a section on line II—II of FIG. 1.

DESCRIPTION OF THE PREFERRED EMBODIMENTS

Discussing the drawing in detail it is firstly emphasized that for a more detailed disclosure of the filtration of viscous solutions reference may be had to the aforementioned U.S. Pat. No. 3,362,533. Details concerning the method and apparatus used for effecting such filtration can be determined from that patent.

As far as the drawing of the present invention is concerned, it will be seen that a pump 1 receives a mixture of spent—i.e., contaminated—filtration aid from a diagrammatically illustrated filter where a viscous solution has been filtered through this filtration aid. The filtration aid itself is a mixture of polyvinyl chloride suspension polymerizate in granule form having the grain or particle size ranges between 15 and 100 microns and between 80 and 200 microns on the other hand. This mixture contains impurities such as swelling substances and cellulose fibers which have been retained in it during filtration of the viscous solution. The pump 1 may advantageously be a so-called eccentric worm pump but can be of other suitable construction. It supplies the spent filter aid in the direction of the arrow through a suitable conduit into a wet classifier 1′ of known construction, for instance the construction disclosed in the aforementioned U.S. patent. The classifier 1′ is illustrated diagrammatically in the drawing but is provided with a rotating screen or sieve drum in the manner disclosed in the aforementioned patent, and it of course contains liquid. In the classifier 1′ the spent filter aid becomes separated from the coarse impurities originally admixed with it and settles to the bottom of the generally downwardly convergent housing of the classifier 1′.

From here the filter aid together with the water used for wet classification is withdrawn by the pump 2, which may be of the same type as the pump 1, and is supplied to a streaming-liquid classifier 3. Herein the filter aid again settles to the bottom whereas the fine fibers and particulate contaminants which were still admixed with them and had not yet been removed by the wet classifier 1′, flowed off with the water at an overflow weir, as illustrated. A level-regulating device of any suitable type is provided to assure that the layer of collected filter aid particles can rise in the container 3 only to a certain level and cannot reach the point where it would float out over the overflow weir and become lost.

A pump 4, again of the same type as the pump 1 or a different suitable type, withdraws a mixture of water and filter aid—with the latter consisting of various different particle sizes—from the bottom of the container 3 and injects a stream of it through conduit 4a tangentially into a container 5 via inlet 5a (see FIG. 2). According to the invention the pump 4 is provided with a suitable regulating means so that its throughput and therefore the flow speed of the stream which it introduces into the container 5, can be regulated at the will of an operator. In the container 5 the finer particles, that is the fraction of the filter aid which contains particles within a smaller size range, floats off at the top to the container 6, whereas the heavier particles are separated from the finer particles by a gravitational fall-out and collect in the bottom of the container 5. A metering pump 7, which may again be an eccentric worm pump, a diaphragm or other suitable pumping device, and which can be adjusted as to its quantity throughput per time unit, withdraws from the bottom of the container 5 a sludge mixture consisting of water and filter aid and introduces it in the direction of the indicated arrow into a mixing container 8 which accommodates the viscous solution—i.e. the viscose—to be filtered. The mixture of filter aid and viscous solution is then withdrawn by the pump 9 and supplied via conduit 9a to the filter which is provided and operates in accordance with the disclosure in my aforementioned U.S. patent. The filter of course already has deposited thereon a layer of alluvial filter aid.

This layer is derived from the overflow at the top of the container 5, which overflow is introduced into the container 6 where the liquid runs off via the illustrated weir whereas the particles collect at the bottom of container 6 and are retained therein by the valve 10 until such time as a layer of alluvial filter aid is to be deposited on the filter. At that time the valve 10 is opened and the particles enter the liquid contained in the container 11 and are circulated with this liquid via pump 12 and conduit 12a through the filter so that at the upper side of the latter a layer of filter aid (not illustrated) becomes deposited, with the thickness of this layer depending on the quantity of water and particles which is circulated through the filter. Once the layer has reached the desired thickness such circulation is terminated, for instance by stopping the pump 12 provided for the purpose, and filtration now begins by passing via the pump 9 the mixture of viscous solution and filter aid from the container 8 to the filter where it passes through the just deposited layer of filter aid.

When the stream of incoming filter aid and liquid into the container 5 from the container 3 is heavy, the container operates in the manner of a hydrocyclone wherein the fine particles are swirled upwardly for conveyance into the container 6, whereas the coarse particles fall out downwardly and collect for subsequent withdrawal by the pump 7. If the stream of incoming liquid and filter aid is slower, that is if the pump 4 is operated to provide a slower throughput, then only a slow streaming takes place in the container 5 and this does not effect classification. Therefore, the filter aid withdrawn by the pump 7 at the bottom of the container 5 will, under these circumstances, have approximately the same particle size distribution as that which prevails at the bottom of the container 3.

It will be appreciated that the particles can thus be readily segregated gravitationally in the container 5 into two fractions, one of which contains finer particles and the other of which contains coarser particles, and that the size range of the particles in each fraction can be adjusted at will by varying the throughput—that is the number of rotations per minute—of the pump 4 and thereby the heaviness and speed of the stream of water and mixed particles which is supplied by the pump 4 into the container 5. This evidently makes it possible to supply both to the container 6 and the container 8 quantities of filter aid particles within a desired size range distribution. For instance it is advantageous if the fraction which is withdrawn at the top of the container 5 contains filter aid particles having a size range distribution of between 15 and 100 microns, whereas the particles supplied from the bottom of the container 5 via the pump 7 to the container 8 advantageously contains a particle size range distribution of between 80 and 200 microns. Of course, the just-mentioned values are purely exemplary and can be adjusted as desired and as necessary for any given circumstances and requirements. This is the great advantage of the present invention, namely that it is possible in this manner to adjust the size ranges precisely to the particular requirements of a given circumstance.

It will be understood that each of the elements described above, or two or more together, may also find a useful application in other types of applications differing from the types described above.

While the invention has been illustrated and described as embodied in a method of regenerating filter aids used in the filtration of viscous solutions, it is not intended to be limited to the details shown, since various modifications and structural changes may be made without departing in any way from the spirit of the present invention.

Without further analysis, the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of regenerating filter aids used in the filtration of viscous solutions and consisting of particulate matter having randomly distributed particle sizes, comprising the steps of separating the spent filter aid from entrapped impurities by wet classification; gravitationally segregating the thus separated particles of the filter aid in a streaming liquid into one fraction containing finer particles and an other fraction containing coarser particles; depositing said finer particles of said one fraction on a filter material as an alluvial filter aid in the filtration of viscous solutions; and admixing said coarser particles of said other fraction with a viscous solution to be filtered.

2. A method as defined in claim 1, wherein said particle sizes range between 15 and 200 microns.

3. A method as defined in claim 1, wherein the step of gravitationally segregating said particles comprises confining a body of liquid in a receptacle, introducing a stream of liquid and of said separated particles into said body of liquid in tangential direction whereupon the coarser particles of said other fraction settle downwardly in said liquid, and separately withdrawing said one fraction in the upper region and said other fraction in the lower region of said body of liquid.

4. A method as defined in claim 3, wherein the step of introducing said stream into said body of liquid comprises pumping said stream into said receptacle via a variable-output pump so as to permit regulation of said flow speed.

5. A method as defined in claim 1; wherein the step of gravitationally segregating said particles comprises varying the flow speed of said streaming liquid to thereby concomitantly vary the size distribution of particles in the respective fractions.

6. A method as defined in claim 1, wherein the step of separating the spent filter aid from entrapped impurities comprises effecting separation of such impurities from a filter aid composed granulate of a synthetic plastic material.

7. A method as defined in claim 1, wherein the step of separating the spent filter aid from entrapped impurities comprises effecting separation of such impurities from a filter aid composed of particulate polyvinylchloride.

8. A method as defined in claim 2, wherein the step of gravitationally segregating said particles comprises varying the flow speed of said streaming liquid to concomitantly vary the size distribution of particles in said one fraction between 15 and 100 microns, and of particles in said other fraction between 80 and 200 microns.

* * * * *